3,179,717
COATING COMPOSITIONS COMPRISING POLYMERS OF VINYL ETHERS OF POLYUNSATURATED FATTY ALCOHOLS
Edward J. Dufek, Lyle E. Gast, Howard M. Teeter, Gus C. Mustakas, and John C. Cowan, all of Peoria, Ill., assignors to the United States of America as represented by the Secretary of Agriculture
No Drawing. Filed June 1, 1960, Ser. No. 33,353
11 Claims. (Cl. 260—886)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to film-forming copolymers formed by copolymerizing a conjugated polyunsaturated fatty vinyl ether and a cyclic comonomer selected from the group consisting of cyclopentadiene, the vinyl ether of dicyclopentadiene alcohol, the vinyl ether of hydrogenated dicyclopentadiene alcohol, the vinyl ether of methyl dicyclopentadiene alcohol, the vinyl ether of cyclicized linseed fatty alcohol, the vinyl ether of dihydroabietyl alcohol, and the vinyl ether of 2-hydromethyl-5-norbornene.

This invention also relates to novel film-forming styrene grafts either of homopolymers of polyunsaturated fatty vinyl ethers or of the above copolymers. The above cyclic comonomer-containing copolymers and styrene-grafted homopolymers and copolymers form adherent, hard, flexible, durable, air-dried or baked clear or (with certain pigments) decorative wrinkle finish films having unexpectedly superior resistances to alkali (up to 10 or more days of exposure to 5 percent sodium hydroxide). By reason of the above properties such films or coatings are especially useful for application to metal drums or cans containing alkaline materials and as protective coatings for alkaline surfaces such as concrete housing blocks and masonry. When applied to primed wood the cyclic copolymers and styrene-grafted homo- and copolymers of our invention readily air dry to give hard, resistant varnish-like films.

Prior art homopolymers of polyunsaturated fatty vinyl ethers such as the vinyl ethers of linseed and soybean alcohols, yield protective coating films that show excellent flexibility and adherence to metal. These prior art films also show greater resistance to 5 percent sodium hydroxide than do many conventional coating materials derived from vegetable oil, e.g., alkyd resins, which are characterized by many ester linkages. However, the alkali-resistance of the homopolymeric polyunsaturated fatty vinyl ether coatings is not as great as would be expected for materials which, on the basis of their chemical structure, should contain no alkali-sensitive functional groups. We have discovered that during the process of producing such hard films by baking, a reaction takes place that is competitive with the desired film-forming reaction. This competitive reaction results in the conversion of ether groups to ester groups, thus reducing the alkali resistance of the films.

Another deficiency of the above prior art polyunsaturated fatty vinyl ether monomers as film-forming materials is that despite the high functionality of these polymers in terms of polyunsaturated fatty acid chains attached to the backbone of the polymer, either they fail to dry at room temperature or they form soft, tacky films. To develop good film properties, baking at temperatures at or above approximately 200° C. in the presence of a metallic drier is required, and even then these films are not as hard as would be anticipated. Baked films prepared from copolymers of polyuncaturated fatty vinyl ethers and a lower alkyl or substituted alkyl fatty vinyl ether proved harder and less prone to wrinkle in dilute alkali than the above fatty vinyl ether homopolymers, but the improvement was only slight or moderate.

In accordance with the present invention, we have discovered that if a cyclic monomer material as shown above is admixed with a polyunsaturated fatty vinyl ether prior to polymerization in an unreactive organic solvent such as toluene and in the presence of a cationic (Friedel-Crafts) catalyst, the copolymer produced yields films having an alkali resistance which is much greater than could have been predicted on the basis of the properties of films of copolymers of the polyunsaturated fatty vinyl ether with non-cyclic comonomers such as ethyl vinyl ether, isobutyl vinyl ether, 2-ethylhexyl vinyl ether, 2,2-dimethyl pentyl vinyl ether, and similar vinyl ethers, incorporation of which produced only minor improvements in film properties. Another unexpected property of films from our copolymers of polyunsaturated fatty vinyl ethers and the above cyclic comonomers is that they show greatly enhanced ability to dry at room temperature and also that they form baked films which are many times harder than the films from the said prior art homopolymers or from the copolymers of polyunsaturated fatty vinyl ethers and lower alkyl fatty ethers.

We have further found that effects similar to those resulting from the copolymerization with the above cyclic monomers are also achieved by the incorporation of styrene into fatty vinyl ether polymers and copolymers. We have not found it practicable to incorporate styrene directly in a single step terpolymer-type copolymerization of all the reactants but have introduced it by copolymerizing styrene with a prepolymerized homopolymer or copolymer of the fatty vinyl ether, thus forming what we designate a styrene-grafted copolymer.

That the effect of incorporation of cyclic monomers on drying is not due to the presence of residual unsaturation in the cyclic moiety of the copolymer is shown by the fact that essentially identical improvement in the film and drying properties is observed whether we use the vinyl ether of dicyclopentadiene alcohol or the vinyl ether of hydrogenated dicyclopentadiene alcohol.

The mechanism whereby the incorporation of the specified cyclic comonomers results in the unexpected improvement in hardness and alkali resistance shown in Table II is not known. Apparently the presence of the cyclic component in some way enhances the formation of the cross-linkages needed to form a film having excellent properties. More such linkages seem to form within a given time with the products of our invention than with the prior art products. Once the polymer chains are bound to each other by an adequate number of these cross-linkages, the competitive reaction leading to the degradation and alkali sensitivity appears to be strongly inhibited. It is also important to note that the formation of a large number of cross-linkages in our invention is accomplished without destroying adherence and flexibility of films on metal and without the development of brittleness.

An unusual and advantageous property of our styrene-graft copolymers is their compatibility even at a 1:1 level with a variety of commercial resins such as the long oil alkyd, urea, epoxy, and polyurethane resins.

Accordingly, a principle object of our invention is the preparation of hard, highly alkali-resistant synthetic resins having especial utility as coatings for metal containers. A further object is the preparation of novel resinous materials in which a minimum of alkali-vulnerable ester-type linkages are formed when the film-coated metal is baked in order to maximally harden the film. A still further object of our invention is the preparation of a novel class of copolymers and graft copolymers containing a significant proportion of at least one cyclic monomer.

The following non-limiting specific examples will further teach the practice of our invention.

EXAMPLE 1

A copolymer of conjugated linseed vinyl ether and the vinyl ether of dicyclopentadiene alcohol was prepared. 356 g. of conjugated linseed vinyl ether and 644 g. of the vinyl ether of dicyclopentadiene alcohol were dissolved in 3,000 ml. of toluene at 25° C. in a suitable flask fitted with a stirrer, recording thermocouple, and nitrogen-inlet tube. The reaction was initiated by adding a solution of 8 percent stannic chloride in toluene. The amount of catalyst necessary was 6.0 ml. per 100 g. of monomers used. As the reaction proceeded, the temperature rose steadily to a maximum in about 5 to 30 seconds and then slowly began to fall. At this point the reaction was terminated by adding 200 ml. of methanol. The rate of temperature rise and the maximum temperature reached were dependent on the proportions of the comonomers. Calcium hydroxide (80 g.) and water (25 ml.) were added to precipitate the catalyst. After filtration the solvents were removed by distillation at reduced pressure to yield 940 g. of copolymer. The molecular weight of the copolymer, obtained by cyroscopic methods, was 2,700. The iodine value was 134.0. The calculated iodine value was 135.8.

EXAMPLE 2

31.2 g. of conjugated linseed vinyl ether and 18.8 g. of the vinyl ether of dicyclopentadiene alcohol were copolymerized as described in Example 1 to give 44.1 g. of copolymer. The molecular weight of the copolymer was 5,000 and iodine value was 127.9; calculated iodine value was 129.6.

EXAMPLE 3

17.8 g. of conjugated soybean vinyl ether and 32.2 g. of the vinyl ether of dicyclopentadiene alcohol were copolymerized as described in Example 1 to give 46.3 g. of copolymer. The molecular weight of the copolymer was 3570 and the iodine value was 125.3; calculated iodine value was 129.2.

EXAMPLE 4

17.6 g. of conjugated linseed vinyl ether and 32.4 g. of the vinyl ether of hydrogenated dicyclopentadiene alcohol were copolymerized as described in Example 1 to give 46.5 g. of copolymer having a molecular weight of 2,750 and an iodine value of 45.4. The monomeric vinyl ether of hydrogenated dicyclopentadiene alcohol (B.P. 57–59° C. at 0.2 mm. Hg; $n_D^{30}$ 1.4928; percent vinyl ether 98.6) was prepared by transvinylating hydrogenated dicyclopentadiene alcohol (having the following constants: B.P. 69–72° C. at 0.15 mm. Hg; $n_D^{30}$ 1.5090; iodine value 0.79; anal., calc. for $C_{10}H_{16}O$: C, 79.1; H, 10.5; found: C, 78.8; H, 10.6) with ethyl vinyl ether using mercuric acetate as catalyst.

EXAMPLE 5

41.5 g. of conjugated linseed vinyl ether and 8.5 g. of the vinyl ether of hydrogenated dicyclopentadiene alcohol were copolymerized as described in Example 4 to give 46.5 g. of copolymer having a molecular weight of 3,550 and an iodine value of 96.5.

EXAMPLE 6

16.2 g. of conjugated soybean vinyl ether and 33.8 g. of the vinyl ether of methyl dicyclopentadiene alcohol were copolymerized as in Example 1 to give 44.5 g. of copolymer with a molecular weight of 1,020 and iodine value of 127.4.

EXAMPLE 7

19.7 g. of conjugated linseed vinyl ether and 30.3 g. of the vinyl ether of 2-hydroxymethyl-5-norbornene were copolymerized as in Example 1 to give 47 g. of copolymer with a molecular weight of 4,000 and iodine value of 157.0. The vinyl ether of 2-hydroxymethyl-5-norbornene was prepared by an ethyl vinyl ether transvinylation of commercial 2-hydroxymethyl-5-norbornene using mercuric acetate as catalyst: it boiled at 65–67° C. at 8 mm. Hg; $n_D^{30}$ 1.4767; percent vinyl ether 96.6.

EXAMPLE 8

33 g. of conjugated linseed vinyl ether and 17 g. of the vinyl ether of 2-hydroxymethyl-5-norbornene were copolymerized as in Example 7 to give 45 g. of copolymer with a molecular weight of 3,500 and an iodine value of 130.7.

EXAMPLE 9

19.7 g. of conjugated soybean vinyl ether and 30.3 g. of the vinyl ether of 2-hydroxymethyl-5-norbornene were copolymerized as in Example 7 to give 44.9 g. of copolymer with a molecular weight of 3,340 and an iodine value of 128.8.

EXAMPLE 10

11.8 g. of conjugated linseed vinyl ether and 38.2 g. of the vinyl ether of dihydroabietyl alcohol were copolymerized as in Example 1 to give 46.4 g. of copolymer with a molecular weight of 1,410 and iodine value of 67.8.

EXAMPLE 11

24 g. of conjugated linseed vinyl ether and 26 g. of the vinyl ether of dihydroabietyl alcohol were copolymerized as in Example 10 to give 45.2 g. of copolymer with a molecular weight of 1,890 and iodine value of 78.4.

EXAMPLE 12

100 g. of pure cyclized linseed vinyl ether was polymerized to give 98 g. of homopolymer with an iodine value of 145.5. The cyclized linseed vinyl ether monomer was prepared as follows: Nonconjugated linseed alcohol was heated with 5 percent potassium hydroxide for 2 hours at 215–230° C. in a nitrogen atmosphere followed by vinylation with acetylene at 185–190° C. This procedure gave 50 percent cyclic linseed vinyl ether (B.P. 130–134° C. at 0.1 mm.; $n_D^{25}$ 1.4723).

Pure cyclic linseed vinyl ether for polymerization was obtained from this crude product by treating the mixture with urea in methanol to form the crystalline adduct of the non-cyclic materials. The crystals were separated by filtration to yield a filtrate containing the cyclic linseed vinyl ether which after distillation from potassium hydroxide gave pure cyclic linseed vinyl ether, B.P. 148–150° C. at 0.35 mm.; $n_D^{25}$ 1.4852; percent vinyl ether 98.0.

100 g. of a mixture of equal parts by weight of cyclized linseed vinyl ether and noncyclic linseed vinyl ether was polymerized as in Example 1 to give 96.6 g. of a copolymer with an iodine value of 89.6.

EXAMPLE 13

Copolymers of conjugated soybean vinyl ether and cyclopentadiene were prepared essentially as described in Example 1, except that the catalyst was increased from 6.0 ml./100 g. of monomers to 20 ml./100 g. of monomers. Whereas the vinyl ether monomers as used in Examples 1 to 12 were completely polymerized and appeared in the product in the same ratio as in the initial charge, cyclopentadiene was only partially polymerized along with all of the fatty vinyl ether. Approximately one-half the cyclopentadiene in the initial charge appeared in the product. The unreacted cyclopentadiene was recovered and used in subsequent preparations.

894 g. of conjugated soybean vinyl ether and 606 g. of freshly distilled cyclopentadiene were copolymerized in 4500 ml. of toluene using 300 ml. of 8 percent stannic chloride in toluene as catalyst. After quenching the reaction, filtering, and removing the solvent and unreacted cyclopentadiene, there was obtained 1197 g. of copolymer with a molecular weight of 3,820 and iodine value of 165.2. Based on the iodine value, the composition of the copolymer was 60 mole percent cyclopentadiene and 40 mole percent conjugated soybean vinyl ether.

EXAMPLE 14

894 g. of conjugated linseed vinyl ether and 606 g. of freshly distilled cyclopentadiene were copolymerized as described in Example 13 to give 1152 g. of copolymer with a molecular weight of 2,900 and iodine value of 172.2.

EXAMPLE 15

Homopolymers of conjugated unsaturated fatty vinyl ethers or the copolymers prepared above can be styrenated as follows to produce other similarly useful surface coating materials.

15 g. of unsaturated fatty vinyl ether homopolymer or copolymer dissolved in 45 g. of toluene was treated with 45 g. of styrene in a suitable flask fitted with a stirrer, viscometer, thermometer, and water condenser. The reaction mixture was heated on a steam bath at 95° C. for 8 to 40 hours, depending on the homopolymer or copolymer to be styrenated. The amount of styrene incorporated into the polymer was determined by periodically withdrawing a small sample of the reaction solution and determining total non-volatile solids in the mixture. A comparison of this weight with the weight of polymer known to be present initially, indicated the amount of styrene combined with the polymer. In this way the reaction could be stopped when the desired amount of styrene had been incorporated. The amount of styrene incorporated into certain homopolymers or copolymers is limited by the gel point of the reaction mixture. Styrene contents of some selected styrene-grafted copolymers that we have found useful as surface coating materials are shown in Table I below:

*Table I*

| Polymer styrenated: | Percent styrene |
|---|---|
| Conjugated linseed vinyl ether homopolymer, mol. wt. 3,920 | 38 |
| Conjugated linseed vinyl ether homopolymer, mol. wt. 1,090 | 62 |
| Cyclized linseed-conjugated linseed vinyl ether copolymer | 32 |
| Vinyl ether of dicyclopentadiene alcohol-conjugated linseed vinyl ether copolymer | 46 |
| Vinyl ether of hydrogenated dicyclopentadiene alcohol-conjugated linseed vinyl ether copolymer | 31 |
| Vinyl ether of 2-hydroxymethyl-5-norbornene conjugated linseed vinyl ether copolymer | 37 |
| Cyclopentadiene-conjugated linseed vinyl ether copolymer | 39 |

FILM PROPERTIES

Films were prepared from the above mentioned copolymers and styrenated products thereof by adding a mixed dried composed of 0.01 percent cobalt and 0.5 percent lead or 0.05 percent manganese (as naphthenates) to a toluene solution of the copolymer or styrenated product and casting a 1 mil film on steel plates. The films were baked in an electric oven at 200–250° C. for 10 to 30 minutes. Air dried films were cast as described above and allowed to cure at 25° C. Film properties are shown in Tables II–V.

*Table II*

[Hardness and alkali resistance of fatty vinyl ether copolymers (films baked at 200° C. for 10 minutes; drier 0.05 percent Mn (as naphthenate))]

| Monomers | | Mole percent of $M_1$ | Hardness (sward) | Resistance 5% NaOH, hrs. |
|---|---|---|---|---|
| $M_1$ | $M_2$ vinyl ether | | | |
|  | Soybean [1] | 0 | 6 | 3 |
|  | Linseed [1] | 0 | 6–8 | 24 |
| Dicyclopentadiene vinyl ether | do | 75 | 36 | 288 |
| Do | do | 50 | 16 | 144+ |
| Do | Soybean | 75 | 28 | 144+ |
| Hydrogenated dicyclopentadiene vinyl ether | Linseed | 75 | 24 | 240+ |
| Do | do | 25 | 8 | 120 |
| Methyl dicyclopentadiene vinyl ether | Soybean | 75 | 52 | 168 |
| Vinyl ether of 2-hydroxy-methyl-5-norbornene | Linseed | 75 | 16 | 288 |
| Do | do | 50 | 10 | 192 |
| Do | Soybean | 75 | 12 | 312 |
| Vinyl ether of dihydroabietyl alcohol | Linseed | 75 | 50 | 312 |
| Do | do | 50 | 18 | 312 |
| Cyclic linseed vinyl ether |  | 100 | 4 | 216 |
| Do | Linseed | 50 | 6 | 144 |
| Cyclopentadiene | do | 60 | 14 | 288 |
| Do | Soybean | 60 | 16 | 288 |

(Mole percent of $M_2$ obtainable by difference.)
[1] The soybean and linseed vinyl ether homopolymers are included for comparison.

*Table III*

[Hardness and alkali resistance of styrenated fatty vinyl ether copolymer; baked at 200° C. for 15 minutes with 0.01 percent cobalt and 0.5 percent lead (as naphthenates)]

| Monomers $M^1$, $M^2$, (mole percent) | Styrene incorporated (percent) | Hardness (sward) | Resistance 5% NaOH (hrs.) |
|---|---|---|---|
| Linseed vinyl ether (100%): | | | |
| (High mol. wt. 3,920) | 38 | 12 | 240+ |
| (Low mol. wt. 1,090) | 62 | 22 | 240+ |
| Dicyclopentadiene vinyl ether (75); linseed vinyl ether (25) | 46 | 74 | 120+ |
| Hydrogenated dicyclopentadiene vinyl ether (25), linseed vinyl ether (75) | 31 | 22 | 480+ |
| Vinyl ether of 2-hydroxy-methyl-5-norbornene (50), linseed vinyl ether (50) | 37 | 28 | 720+ |
| Cyclic linseed vinyl ether (50), linseed vinyl ether (50) | 32 | 12 | 480+ |
| Cyclopentadiene (60), linseed vinyl ether (40) | 39 | 24 | 240+ |

Table IV

[Hardness of fatty vinyl ether copolymers (air-dried overnight at room temperature with 0.01 percent cobalt and 0.5 percent lead drier (as naphthenates))]

| Monomers | | Mole percent of $M_1$ | Hardness (sward units) |
|---|---|---|---|
| $M_1$ | $M_2$ vinyl ether | | |
| Cyclopentadiene | Linseed | 60 | 28 |
| Do | Soybean | 60 | 34 |
| Dicyclopentadiene vinyl ether | Linseed | 75 | 28 |
| Hydrogenated dicyclopentadiene vinyl ether. | ____do____ | 75 | 16 |
| Vinyl ether of 2-hydroxymethyl-5-norbornene. | ____do____ | 75 | 2 |
| Vinyl ether of 2-hydroxymethyl-5-norbornene. | ____do____ | 50 | 12 |
| Vinyl ether of dihydroabietyl alcohol. | ____do____ | 50 | 4 |

Table V

Hardness and alkali resistance of styrenated fatty vinyl ether copolymers (air-dried overnight at room temperature with 0.01 percent cobalt and 0.5 percent lead drier (as naphthenates))]

| Monomers $M^1$, $M^2$ (mole percent) | Styrene incorporated (Percent) | Hardness | Resistance to 5% NaOH (hours) |
|---|---|---|---|
| Linseed vinyl ether (100%) | 38 | 8 | 216+ |
| Cyclopentadiene (60), linseed vinyl ether (40) | 39 | 44 | 24 |
| Hydrogenated dicyclopentadiene vinyl ether (25), linseed vinyl ether (75) | 31 | 10 | 120 |
| Vinyl ether of 2-hydroxymethyl-5-norbornene (50), linseed vinyl ether (50) | 37 | 16 | 240+ |
| Dicyclopentadiene vinyl ether (75), linseed vinyl ether (25) | 46 | 44 | 240+ |

Having thus described our invention, what we claim is:

1. The composition of claim 11 wherein the film-forming component is a copolymer of the vinyl ether of a conjugated polyunsaturated vegetable oil fatty alcohol and the vinyl ether of dicyclopentadiene alcohol.

2. The composition of claim 11 wherein the film-forming component is a copolymer of the vinyl ether of a conjugated polyunsaturated vegetable oil fatty alcohol and the vinyl ether of methyl dicyclopentadiene alcohol.

3. The composition of claim 11 wherein the film-forming component is a copolymer of the vinyl ether of a conjugated polyunsaturated vegetable oil fatty alcohol and the vinyl ether of hydrogenated dicyclopentadiene alcohol.

4. The composition of claim 11 wherein the film-forming component is a copolymer of the vinyl ether of a conjugated polyunsaturated vegetable oil fatty alcohol and the vinyl ether of 2-hydroxymethyl-5-norbornene.

5. The composition of claim 11 wherein the film-forming component is a styrene-grafted copolymer of the vinyl ether of a conjugated polyunsaturated vegetable oil fatty alcohol and the vinyl ether of dihydroabietyl alcohol.

6. The composition of claim 11 wherein the film-forming composition is a styrene-grafted copolymer of the vinyl ether of a conjugated polyunsaturated vegetable oil fatty alcohol and the vinyl ether of dicyclopentadiene alcohol.

7. The composition of claim 11 wherein the film-forming component is a styrene-grafted copolymer of the vinyl ether of a conjugated polyunsaturated vegetable oil fatty alcohol and the vinyl ether of hydrogenated dicyclopentadiene alcohol.

8. The composition of claim 11 wherein the film-forming component is a styrene-grafted copolymer of the vinyl ether of a conjugated polyunsaturated vegetable oil fatty alcohol and the vinyl ether of cyclized linseed fatty alcohol.

9. The composition of claim 11 wherein the film-forming component is a styrene-grafted copolymer of the vinyl ether of a conjugated polyunsaturated vegetable oil fatty alcohol and the vinyl ether of 2-hydroxymethyl-5-norbornene.

10. A film-forming composition comprising toluene solvent, a metallic drier, and an uncrosslinked copolymer consisting of 40 mole percent of a vinyl ether of a conjugated polyunsaturated vegetable oil fatty alcohol and 60 mole percent of cyclopentadiene, said copolymer having a molecular weight of about 3,800 and an iodine value of 165, baked crosslinked films of said copolymer having a Sward hardness of about 14–16 and an alkali-resistance for about 288 hours to a 5 percent solution of sodium hydroxide.

11. A film-forming composition comprising an inert solvent, a metallic drier, and, as the film-forming component thereof, a member of the group consisting of (a) a copolymer obtained by reacting from 25 mole percent to 75 mole percent of a vinyl ether of a conjugated polyunsaturated vegetable oil fatty alcohol with from 75 mole percent to 25 mole percent of a cyclic monomer of the group consisting of cyclopentadiene, the vinyl ether of methyl dicyclopentadiene alcohol, the vinyl ether of dicyclopentadiene alcohol, the vinyl ether of hydrogenated dicyclopentadiene alcohol, the vinyl ether of cyclized linseed fatty alcohol, the vinyl ether of dihydroabietyl alcohol, and the vinyl ether of 2-hydroxymethyl-5-norbornene, (b) a styrene-grafted reaction product consisting of 32–62 percent by weight of styrene and from 68–38 percent by weight of a homopolymer of a vinyl ether of a conjugated polyunsaturated vegetable oil fatty alcohol and (c) a styrene-grafted reaction product of styrene and said copolymer defined in (a), said last named styrene-grafted reaction product consisting of 31–46 percent by weight and 69–54 percent by weight of said copolymer, baked films of said film-forming compositions being characterized by Sward hardness values of about from 2–75 and a resistance for up to about from 120 to 720 hours to a 5 percent solution of sodium hydroxide.

References Cited by the Examiner

UNITED STATES PATENTS

| | | | |
|---|---|---|---|
| 2,689,233 | 9/54 | Hoya | 260—23.7 |
| 2,691,646 | 10/54 | Young | 260—82.1 |
| 2,861,050 | 11/58 | Christenson | 260—23.7 |
| 2,889,309 | 6/59 | Teeter et al. | 260—45.9 |
| 2,927,934 | 3/60 | Greenspon | 260—82.1 |
| 2,994,681 | 8/61 | Hammon et al. | 260—884 |
| 3,025,281 | 3/62 | Chiang | 260—91.1 |

LEON J. BERCOVITZ, *Primary Examiner.*

R. D. NEVIUS, MILTON STERMAN, *Examiners.*